United States Patent
Page et al.

(10) Patent No.: US 8,662,944 B2
(45) Date of Patent: Mar. 4, 2014

(54) AMPHIBIOUS SUBMERSIBLE VEHICLE

(75) Inventors: Mark Allan Page, Cypress, CA (US); Christopher John Page, Long Beach, CA (US); Matthew Robert McCue, Irvine, CA (US); Michael Karl Kohl, Rancho Palos Verdes, CA (US); Patrick Quincey Stout, Los Angeles, CA (US); Neil Wayne Roberts, San Marcos, CA (US)

(73) Assignee: DZYNE Technologies, Inc., Reston, VA (US)

( * ) Notice: Subject to any disclaimer, the term of this patent is extended or adjusted under 35 U.S.C. 154(b) by 0 days.

(21) Appl. No.: 13/429,267

(22) Filed: Mar. 23, 2012

(65) Prior Publication Data
US 2013/0078876 A1  Mar. 28, 2013

Related U.S. Application Data

(60) Provisional application No. 61/465,756, filed on Mar. 24, 2011.

(51) Int. Cl.
*B60F 3/00* (2006.01)

(52) U.S. Cl.
USPC ............................ 440/12.5; 440/6; 114/312

(58) Field of Classification Search
USPC ........ 114/330, 312, 315, 337; 440/6, 36, 12.5
See application file for complete search history.

(56) References Cited

U.S. PATENT DOCUMENTS

| | | | |
|---|---|---|---|
| 1,677,846 A | 7/1928 | Land | |
| 3,832,965 A | 9/1974 | Walker | |
| 3,917,086 A | 11/1975 | Sexton | |
| 4,579,297 A * | 4/1986 | Ayoola | 244/2 |
| 4,889,066 A * | 12/1989 | Neil et al. | 114/334 |
| D305,877 S | 2/1990 | Price, II | |
| 5,116,069 A * | 5/1992 | Miller | 280/5.509 |
| 5,379,714 A * | 1/1995 | Lewis et al. | 114/315 |
| 5,562,066 A | 10/1996 | Gere et al. | |
| 5,590,617 A | 1/1997 | Gere et al. | |
| 5,653,404 A | 8/1997 | Ploshkin | |
| 5,704,309 A * | 1/1998 | Kohnen | 114/312 |
| 5,727,494 A | 3/1998 | Caserta et al. | |
| 5,755,173 A | 5/1998 | Rorabaugh | |
| 5,769,021 A | 6/1998 | Schad | |
| 5,832,862 A | 11/1998 | Hulten | |

(Continued)

FOREIGN PATENT DOCUMENTS

| | | |
|---|---|---|
| WO | WO2008060318 A2 | 5/2008 |
| WO | WO2010012285 A3 | 2/2010 |
| WO | WO2010012285 A2 | 4/2011 |

OTHER PUBLICATIONS

"Deep Flight", http://deepflight.com/subs/index.htm.

(Continued)

*Primary Examiner* — Lars A Olson
*Assistant Examiner* — Jovon Hayes
(74) *Attorney, Agent, or Firm* — Tsircou Law, P.C.

(57) ABSTRACT

A vehicle is provided that is amphibious to include submersible operations. The vehicle has wings configured to generate a sufficient dive force to oppose buoyancy of the vehicle, when desired, which are disposed on opposing sides of a central hull. The vehicle is configured to enable easy transition from land operations to water operations, to include water surface travel as well as submerged travel.

20 Claims, 6 Drawing Sheets

(56) References Cited

U.S. PATENT DOCUMENTS

| | | | |
|---|---|---|---|
| 6,089,178 A * | 7/2000 | Yamamoto et al. | 114/337 |
| 6,276,294 B1 | 8/2001 | Geriene et al. | |
| 6,474,255 B2 * | 11/2002 | Geriene et al. | 114/312 |
| 6,482,052 B1 | 11/2002 | Gilijam | |
| 6,688,251 B1 | 2/2004 | Peralta | |
| D487,245 S | 3/2004 | Geriene et al. | |
| 6,698,373 B2 | 3/2004 | Geriene | |
| D492,242 S | 6/2004 | Geriene et al. | |
| 6,755,701 B2 * | 6/2004 | Dornier et al. | 440/36 |
| 6,758,291 B1 * | 7/2004 | Koch | 180/11 |
| 7,131,389 B1 * | 11/2006 | Hawkes | 114/330 |
| 7,281,484 B1 * | 10/2007 | Alvarez-Calderon | 114/312 |
| 7,934,963 B1 | 5/2011 | Carambat | |
| 7,942,429 B2 | 5/2011 | Hill | |
| 8,025,021 B2 | 9/2011 | Gosling | |
| 8,127,704 B2 | 3/2012 | Vosburgh | |
| 8,162,253 B2 * | 4/2012 | Seiford, Sr. | 244/7 R |
| 2008/0017426 A1 | 1/2008 | Walters | |
| 2011/0036938 A1 * | 2/2011 | Blomeley | 244/2 |
| 2013/0078876 A1 * | 3/2013 | Page et al. | 440/6 |

OTHER PUBLICATIONS

"Borgward Seeteufel", http://strangevehicles.greyfalcon.us/BORGWARD%20SEETEUFEL.htm.

"007's Esprit Submarine", http://www.lotusespritworld.com/EOtherstuff/Submarine.html.

* cited by examiner

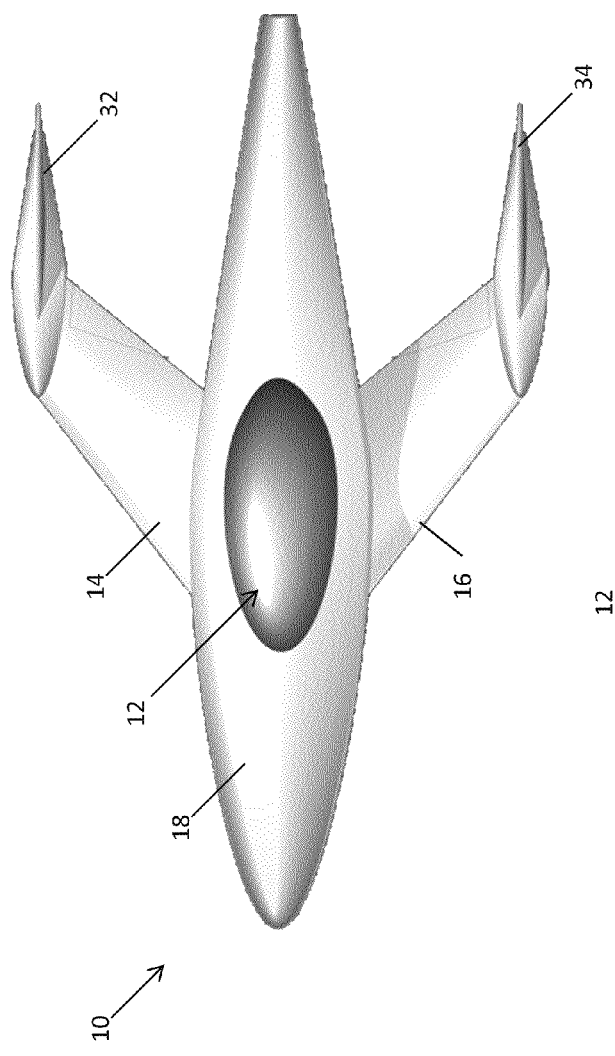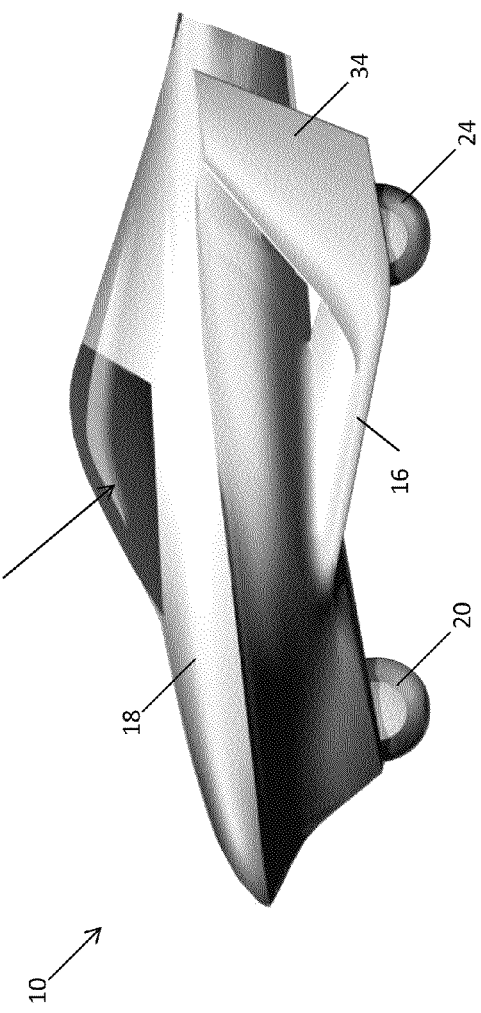

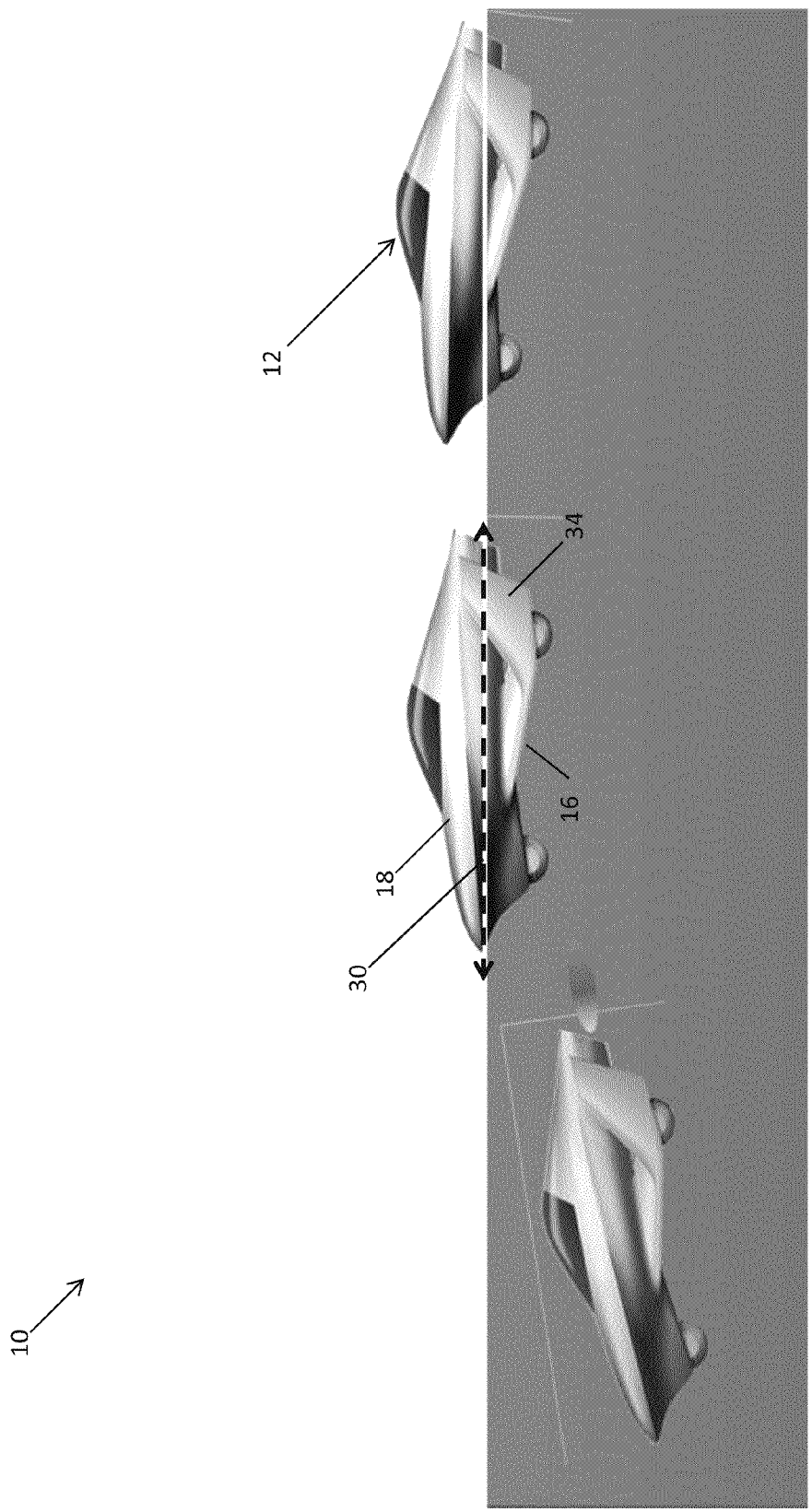

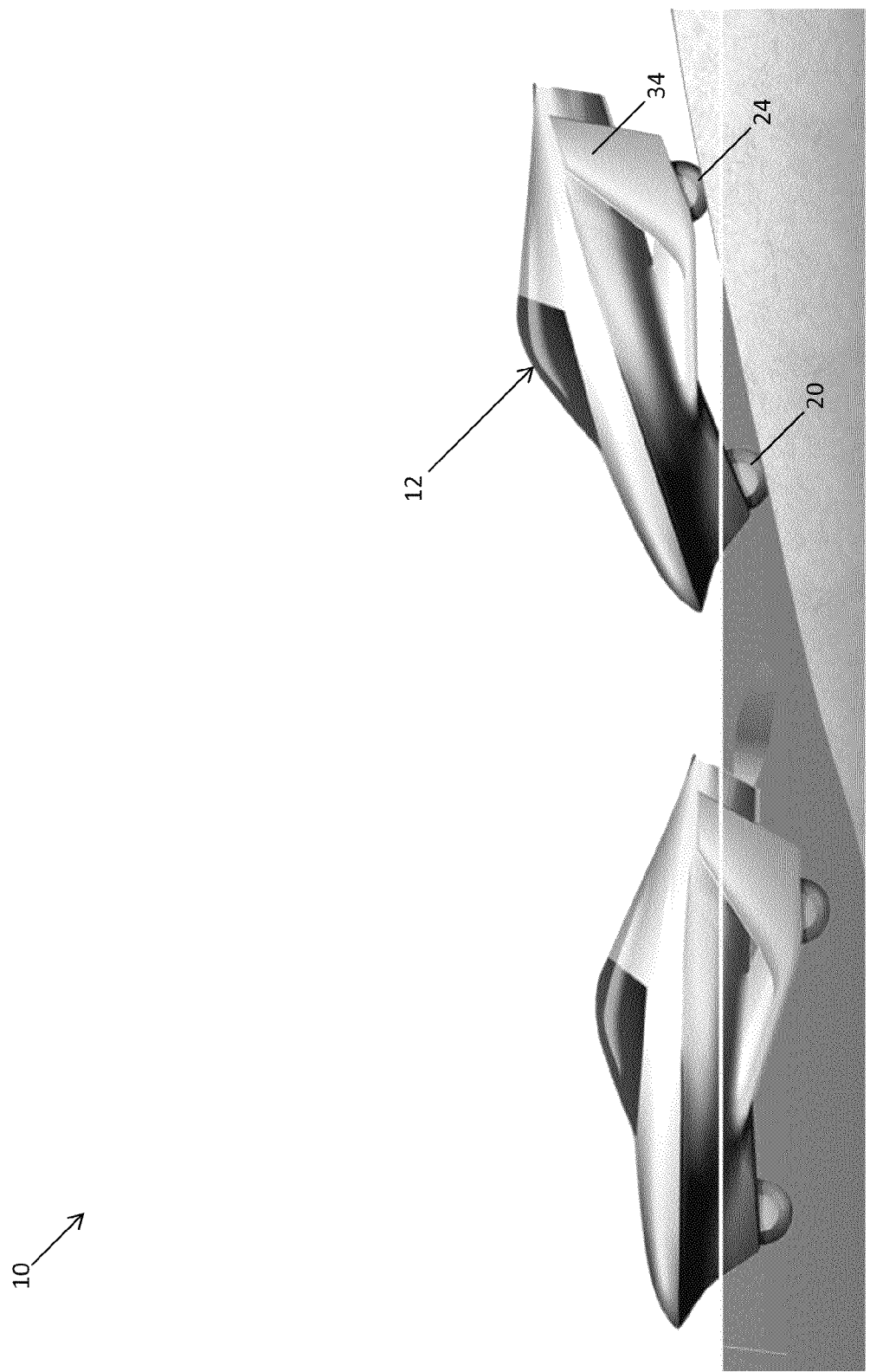

US 8,662,944 B2

AMPHIBIOUS SUBMERSIBLE VEHICLE

CROSS REFERENCE TO RELATED APPLICATIONS

This application claims the benefit of U.S. Provisional App. No. 61/465,756, filed Mar. 24, 2011, which is incorporated by reference.

FIELD OF THE INVENTION

The present invention relates generally to submersible vehicles and, more particularly, to vehicles having both amphibious and submersible functions.

BACKGROUND OF THE INVENTION

Submersible vehicles such as traditional submarines have traditionally been confined to for use in military and research applications. Several barriers have inhibited submarines from broad use in commercial and recreational applications. For example, cost and logistics of handling even the smallest subs have made such vehicles impractical for recreational use. Moreover, traditional submarine designs incorporate substantial ballast tanks, requiring the vehicle to be relatively heavy to compensate for the displacement of the non-ballast volume. In many instances, a traditional submarine configured for two passengers can weigh over 4,000 lbs. In addition, current submersible vehicles require considerable training and experience. As a result, submersible vehicles have found little success for recreational use.

Recreational watercrafts have been traditionally dedicated for travel along the water surface. Such vehicles have been generally effective for that purpose; however, shortfalls exist. For example, such vehicles can only operation on water. Thus, the user must implement alternate means for transporting the vehicle from storage to the water, or arrange for storage in the water.

It should, therefore, be appreciated that there exists a need for a vehicle that addresses these shortcomings and others.

SUMMARY OF THE INVENTION

Briefly, and in general terms, the invention is embodied in a vehicle that is amphibious to include submersible operations. The vehicle has wings configured to generate a sufficient dive force to oppose buoyancy of the vehicle, when desired, which are disposed on opposing sides of a central hull. The vehicle is configured to enable easy transition from land operations to water operations, to include water surface travel as well as submerged travel.

More particularly, in an exemplary embodiment, the vehicle includes a body having a central hull and a pair of wings. The wings are coupled to the opposing sides of the central hull below the designed waterline of the central hull. The wings have an inverted wing profile configured to generate a downward dive force sufficient to overcome buoyancy forces of the vehicle once sufficient speed is achieved. A water propulsion system is coupled to the body and configured to propel the body in a forward direction in water operations.

In a detailed aspect of an exemplary embodiment, each of the wings terminates in an upwardly oriented winglet and includes adjustable control surfaces configured as elevons positioned aft of a center of gravity of the vehicle.

In another detailed aspect of an exemplary embodiment, the vehicle includes a detachable trailer that houses a fuel tank, a power generator coupled to the fuel tank and detachably and operatively coupled to a battery assembly disposed in the body, and an air compressor detachably and operatively coupled to air tanks disposed in the body.

In yet another detailed aspect of an exemplary embodiment, the vehicle includes a battery assembly disposed in the central hull and operably coupled to the an electric motor assembly for powering a water propulsion system of the vehicle.

In yet another detailed aspect of an exemplary embodiment, the vehicle includes an air-supply system configured to manage air pressure and oxygen levels within the cabin. The air-supply system includes an air tank assembly disposed in the body and a compressor assembly coupled to the air tank assembly for providing air to the air tank assembly.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description section having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which:

FIG. 1 is a top plan view of a vehicle accordance with the invention.

FIG. 2 is a side elevational view of the vehicle of FIG. 1.

FIG. 3 is a side elevational view of the vehicle of FIG. 1, depicting a time sequence as the vehicle submerges.

FIG. 4 is a side elevational view of the vehicle of FIG. 1, depicting a time sequence as the vehicle enters the water.

DETAILED DESCRIPTION OF EXEMPLARY EMBODIMENTS

Figure 5:
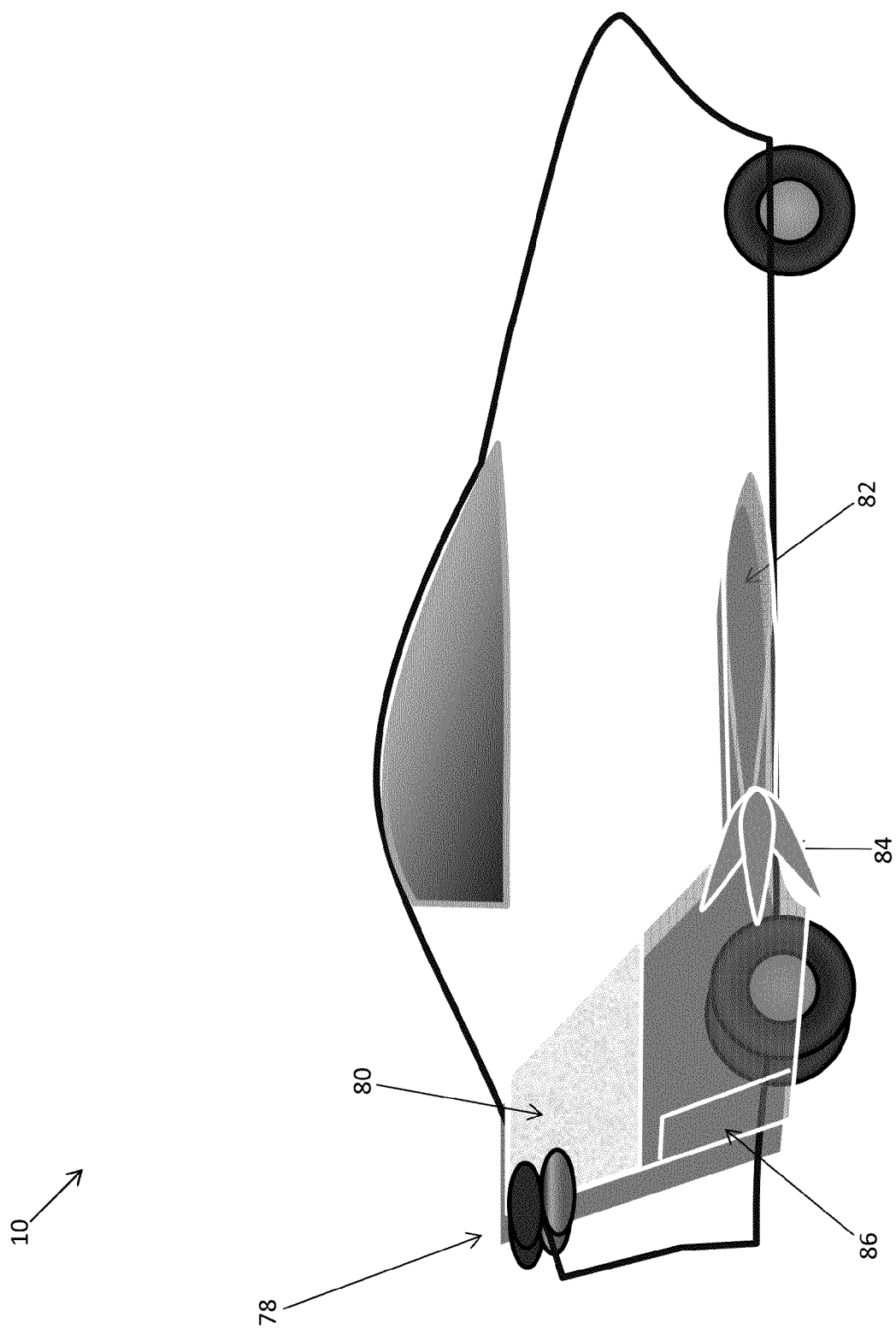
FIG. 5 is a side view of the vehicle of FIG. 1, depicting a cross section of a wing of the vehicle.

Referring now to the drawings, and particularly FIGS. 1 to 3, there is shown an amphibious and submersible vehicle 10 having a watertight cabin 12 and a pair of wings (14, 16) disposed on opposing sides of a central hull 18. The vehicle further includes wheels (20, 22, 24) positioned to enable the vehicle to drive on land. The vehicle is configured to enable easy transition from land operations to water operations, to include water surface travel as well as submerged travel. In the exemplary embodiment, the wings are configured to facilitate the vehicle's position relative to the water surface.

As shown in FIG. 2, the vehicle 10 is configured such that an operator can drive directly into the water. Beneficially, the cabin 12 is watertight, allowing the operator to wear any attire. For example, an operator to enter the vehicle in street clothing, drive from a parking lot onto the beach and into the water. Moreover, the vehicle is configured such that the wings are positioned below the water line in typical water surface operations. In the exemplary embodiment, the vehicle is configured such that the water line will be maintained between the sill of the canopy 26 and above the horizontal component of the wings 14, 16.

In the exemplary embodiment, the wings are configured to facilitate the vehicle's position relative to the water surface, utilizing an inverted wing design. Wings are configured such that as water travels over the wings a general downward force relative to an upper surface of the wing (e.g., dive force or down lift) can be generated. The wings further include winglets (32, 34), which further facilitate water operations by reducing the submerged drag while allowing the span to be no more than a passenger car. The vehicle further includes a control system 28 to assist in controlling the vehicle's positioning in water operations.

The wings 14, 16 are coupled to the central hull 18 below a designed waterline 30 of the central hull. The term "designed waterline," unless otherwise indicated, is intended to mean the intersection of the hull with the water surface when the vehicle is floating on an even keel in designed conditions or otherwise within a maximum permissible operating draught.

With reference now to FIG. 3, the vehicle 10 can transition from the water surface to submerged travel once at a dive speed with ease. The dive speed is achieved when sufficient dive force can be generated to overcome the buoyancy of the vehicle. The controls 28 of the vehicle can be trimmed to maintain travel on the water surface at any speed. However, once dive speed is achieved or exceeded, the controls 28 of the vehicle can be trimmed to facilitate generation of the dive force. So long as the dive speed is maintained, the vehicle can maintain submerged operations for an extended period of time. If the vehicle slows below the dive speed, the vehicle will lose water depth and tend to surface.

The control system 28 further enables dynamic and acrobatic maneuvering of the vehicle while submerged. The vehicle can to descend, ascend, turn, loop, and barrel roll, while underwater. As discussed in further detail below, the propulsion system can also be configured to aid in directional control of the vehicle in both water surface travel and submerged travel. Notably, the vehicle is inherently safe. For example, if power to the propulsion system is lost, the vehicle will slow below the dive speed and thus surface.

In various embodiments, the vehicle can utilize one or more types of control systems such as tail-planes, canards, elevons, rudders, movable ballast, fans, propellers, or jets (among others), for controlling the vehicle in water operations. Such control systems can be incorporated on wings or otherwise positioned on the vehicle body. Moreover, other embodiments can incorporate other types of wing designs based on design considerations, such as vehicle size, payload capacity, anticipated use (e.g., recreational, commercial, or military), among others.

The vehicle can be compact, lightweight and low cost, and yet highly functional. In an exemplary embodiment, the vehicle incorporates a cabin configured for a single occupant, while having a gross weight between about 600 pounds and 1000 pounds, while achieving land speeds in excess of 45 mph, water surface speed in excess of 10 knots, and a submerged speed of 12 knots, in a vehicle having a length of about 9 feet, wingspan of about 7 feet, and height of about 4½ feet.

Figure 6:
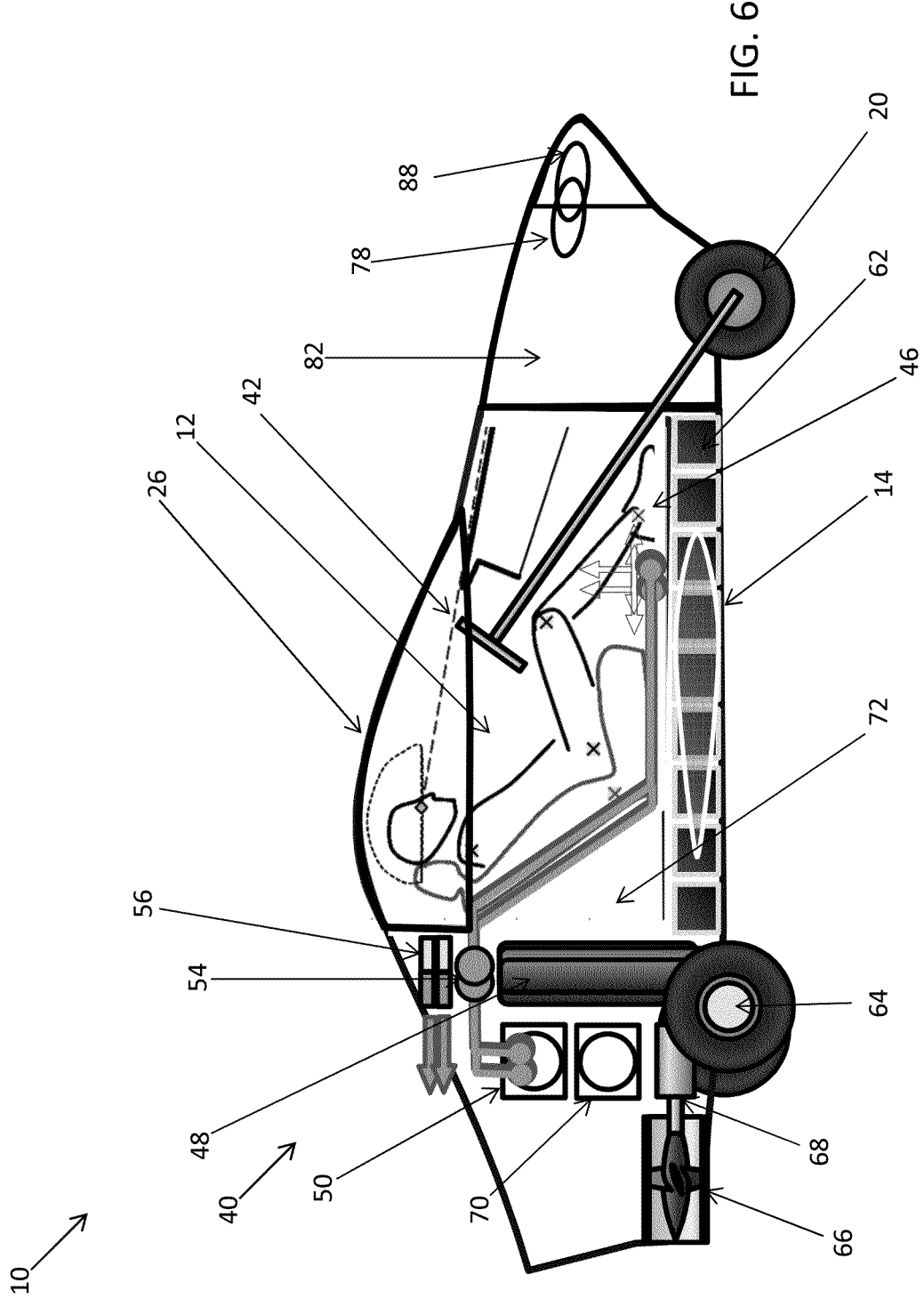
FIG. 6 is a side view of the vehicle of FIG. 1, depicting a cross-section of a central hull of the vehicle, to reveal several features therein.

With reference now to FIG. 6, the cabin 12 is configured for a single occupant utilizing a recumbent, semi-recumbent, or upright seating with a sliding canopy 26. The canopy can slide open for land travel and/or water surface travel, as desired. With the canopy closed, the cabin is watertight and pneumatically isolated such that the vehicle's air supply system 40 can maintain a desired cabin pressure and oxygen level within the cabin while the vehicle is submerged. A steering control system 42 is also provided so that the user can operate the vehicle. In the exemplary embodiment, a steering wheel 44 and pedals 46 are used. Nonetheless, various other control configurations for controlling the vehicle can be implemented, as desired.

While submerged, the pressure differential between the cabin and the outside environment preferably will hold the canopy closed passively, nonetheless, the latches or other securing mechanisms are provided for securing the canopy in place. Beneficially, with the canopy slid forward you can serve as an effective windscreen, while on land and on the water surface, when boating. In other embodiments, a door or hinged canopy can be used, as desired. The cabin can further include an escape hatch (not shown), which serves as an egress route in emergency situations.

The vehicle's air-supply system 40, including air tanks 48 coupled to an air-fill compressor 50. The air fill compressor is configured to maintain air pressure within the tanks 48. To that end, the compressor draws outside air into the tank through vents 52, while the vehicle is not submerged. In addition, the air supply system can further include a snorkel (not shown) assembly so that the compressor can draw in air even while the vehicle is submerged.

The air tanks are coupled to air regulators 54 that control the flow of air from the tanks into the cabin. In the exemplary embodiment, cabin pressure is maintained at approximately one atm. while submerged. In this manner, the occupant can breathe freely without need of the mouth regulator; although, the mouth regulator can be provided as a backup system. In other embodiments, a mouth regulator can be the sole means of providing air to the occupant while submerged.

The air supply system 40 further includes air ejectors 56 that expel the waste air out of the cabin, e.g., through ports, vents, etc. The air ejectors can be configured such that proper cabin pressure and oxygen levels are maintained. In the exemplary embodiment, as best seen in FIG. 6, the air tanks, the compressors, the regulators, and the ejectors are all positioned in an aft portion of the hull behind the cabin. Various other components and mechanisms can be used for maintaining pressure levels and oxygen levels while submerged, e.g., displacement pumps to circulate and eject waste air, and so on.

Wither continued reference to FIG. 6, the power system 60 of the vehicle includes batteries 62 positioned in a lower portion of the central hull 18. The batteries are operably coupled to electric motors 64 for powering one or more of the wheels, e.g., drive wheels, for land operation. The power system further includes a jet pump 66 positioned in an aft portion of the hull to enable propulsion in water operations. The jet pump can be coupled to an electric motor 68 powered by the batteries. Various other configurations for water propulsion known in the art can be used, e.g., propellers, paddle-wheels, and so on.

The power system 60 can further include a gas-powered or other generator 70 for charging the batteries. In the exemplary embodiment, the generator 70 and a fuel tank 72 are disposed in the aft portion of the hull. Alternatively, hybrid, other gas-powered, or other power systems can be used with suitable accommodations. The motors and batteries would be located in a separate sealed compartment for safety considerations.

With reference now to FIG. 5, the wings 14, 16 include several features that facilitate operation and maneuvering of the vehicle 10. The wings include one or more buoyant chambers 80, which facilitate stability in water operations. In the exemplary embodiment, the buoyant chambers are disposed in the terminal ends of the winglets 32, 34. The wings can further include one or more passive flood chambers to reduce buoyancy 82 that can be used during submerged travel. The flood chambers can be disposed in the horizontal wing components, the winglets, or both. In addition, flood chamber can be found in the central hull, as shown in FIG. 6. None of the flood chambers requires active regulation, pumps, or valves. However, pumps and valves may be useful in some implementations. The flood chambers reduce buoyancy to allow small efficient wings and propulsion for submerged operations.

Elevons 84 are disposed on the horizontal wing components, which operation in cooperation to control pitch and roll of the vehicle while submerged. Additional elevons can also operation to aid in controlling the dive force directly. The wings further include rudders 86 positioned on the winglets that can be used for control both on the water surface and while submerged. The central hull 18 can further include pitch control surfaces 88 (FIG. 6) positioned along the nose section. In the present embodiment, the elevons are rigged aft of the center-of-gravity of the vehicle providing pitching leverage.

With reference again to FIGS. 3 and 6, the vehicle 10 is configured for good performance on land. In the exemplary embodiment, the front wheel 20 is positioned in the nose portion of the central hull. The front wheel steerable and can be powered. Two rear wheels 22, 24 are coupled to the winglets 32, 34, respectively. In the exemplary embodiment, the wheels are not configured to retract; although, other embodiments can be configured with retractable wheels, such as during water operations. The wheels are configured for effective transport on beach sand, as well paved roads. Appropriate lighting for road use, such as brake light and turn signals 78, can be provided on the vehicle (FIG. 5).

Figure 7:
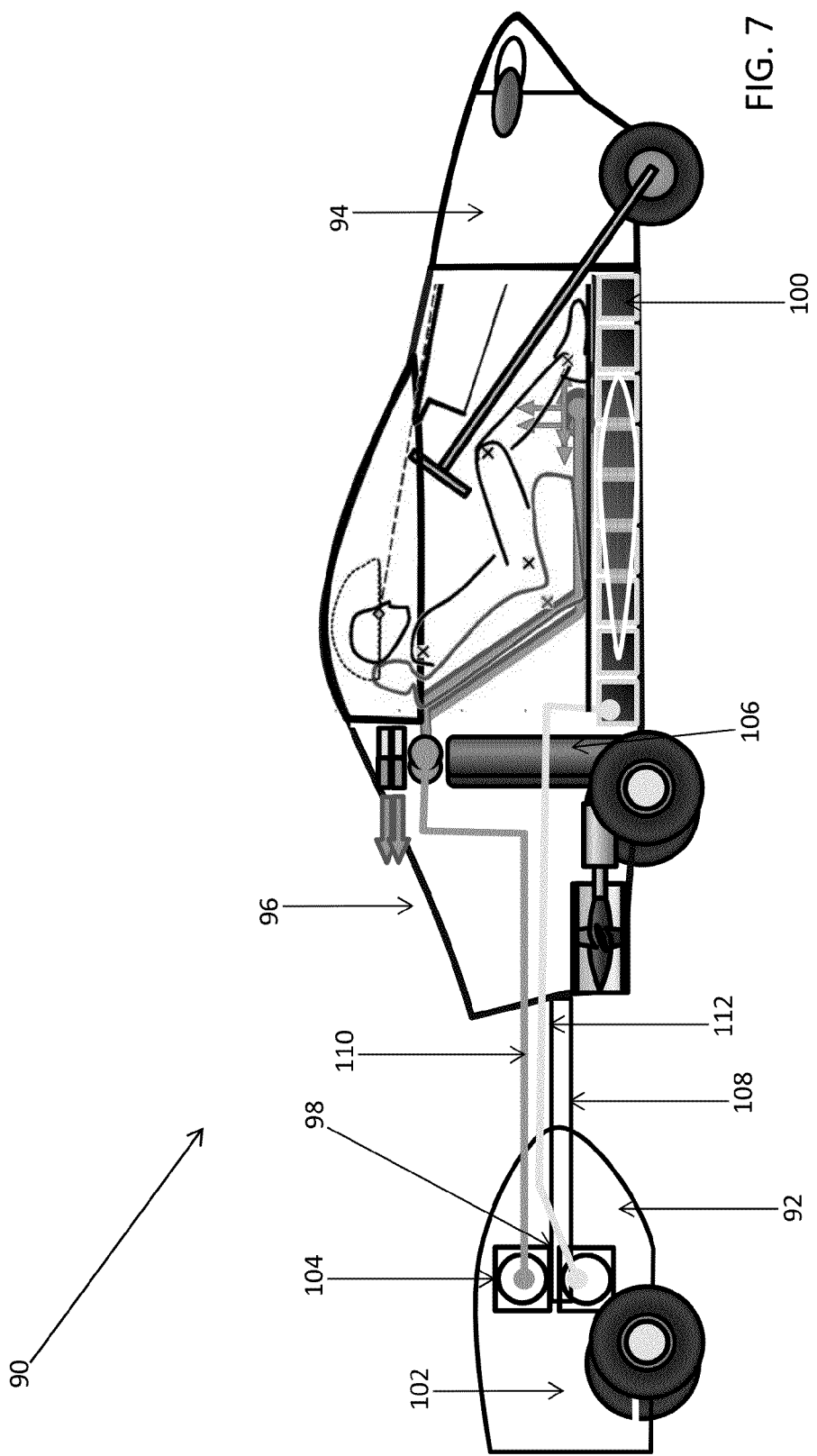
FIG. 7 is a side view of a second embodiment of a vehicle in accordance with the invention, depicting a cross-section of a trailer and a central hull of the vehicle, to reveal several features therein.

With reference now to FIG. 7, a second embodiment is depicted, in which a vehicle 90 includes a trailer 92 detachably coupled to a central hull 94 of the body 96. The vehicle includes components as discussed above; however, in this embodiment, several of components are disposed in the trailer. More particularly, the trailer includes a power generator 98 of the power system, for charging the batteries 100 disposed in the central hull. In this example, a gas-powered generator is used coupled to a fuel tank 102 of the trailer. However, other power generators can be used. The trailer further includes a fill compressor 104 of the air system, for filling the air tanks 106 within the central hull.

The trailer includes a coupling rod 108 having an attachment end that mates with a corresponding attachment port on the central hull. The attachments are configured to enable convenient mating of (a) the air lines 110 between the compressor 104 and the air tanks 106 and (b) the power lines 112 between the power generator 98 and the batteries 100.

In other embodiment, the distribution of components between the trailer and the central hull can be varied. For example, the trailer can exclude the compressor, which would permanently reside in the central hull. Alternatively, components can be configured for interchangeable placement between the trailer and the hull. For example, the compressor can be configured such that it can be placed interchangeably for operation either in the trailer or in the central hull, which would enable the operator to configure the vehicle based upon particular needs.

It should be appreciated from the foregoing that the present invention provides a vehicle that is amphibious to include submersible operations. The vehicle has wings configured to generate a sufficient dive force to oppose buoyancy of the vehicle, when desired, which are disposed on opposing sides of a central hull. The vehicle is configured to enable easy transition from land operations to water operations, to include water surface travel as well as submerged travel.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. An amphibious submersible vehicle, comprising:
a body having a central hull and a pair of wings, the central hull having a designed waterline and a watertight cabin, the pair of wings disposed on opposing sides of the central hull below the designed waterline and having an inverted wing profile that generates a downward dive force sufficient to overcome buoyancy forces of the vehicle once sufficient speed is achieved;
a plurality of wheels coupled to a lower portion of the body positioned to contact the ground in land operations;
a water propulsion system coupled to the body to propel the body in a forward direction in water operations;
a battery assembly disposed in the body and operatively coupled to the water propulsion system;
an air tank disposed in the body; and
a detachable trailer that houses a power generator detachably and operatively coupled to the battery assembly, and an air compressor detachably and operatively coupled to the air tanks disposed in the body.

2. A vehicle as defined in claim 1, wherein the plurality of wheels includes a nose wheel coupled to a nose section of the central hull, a left wheel coupled to a left wing of the pair of wings, and a right wheel coupled to a right wing.

3. A vehicle as defined in claim 2, wherein the nose wheel is operatively coupled to a power assembly, and the left wheel and the right wheel are mounted for free wheel rotation.

4. A vehicle as defined in claim 1, wherein the pair of wings include adjustable control surfaces.

5. A vehicle as defined in claim 4, wherein the control surfaces are elevons positioned aft of a center of gravity of the vehicle.

6. A vehicle as defined in claim 1, wherein the water propulsion system includes a jet pump or propeller.

7. A vehicle as defined in claim 1, further comprising electrical motors disposed in a first compartment of the body and batteries disposed in one or more compartments of the body separate from the first compartment.

8. An amphibious submersible vehicle, comprising:
a body having a central hull and a pair of wings, the central hull having a designed waterline and a watertight cabin, the pair of wings disposed on opposing sides of the central hull below the designed waterline and having an inverted wing profile that generates a downward dive force sufficient to overcome buoyancy forces of the vehicle once sufficient speed is achieved, each of the wings terminating in an upwardly oriented winglet;

a plurality of wheels coupled to a lower portion of the body positioned to contact the ground;
a water propulsion system coupled to the body to propel the body in a forward direction; and
a power assembly that applies a motive force to one or more of the plurality of wheels for land operations and that applies motive force to the water propulsion system for water operations.

9. A vehicle as defined in claim 8, further comprising a detachable trailer that houses a fuel tank, a power generator coupled to the fuel tank and detachably and operatively coupled to a battery assembly disposed in the body, and an air compressor detachably and operatively coupled to air tanks disposed in the body.

10. A vehicle as defined in claim 8, wherein the pair of wings include adjustable control surfaces.

11. A vehicle as defined in claim 10, wherein the control surfaces are elevons positioned aft of the center of gravity of the vehicle and rudders positioned on the winglets.

12. A vehicle as defined in claim 8, wherein the central hull includes a flood chamber.

13. A vehicle as defined in claim 8, further comprising an air-supply system that manages air pressure and oxygen levels within the cabin.

14. A vehicle as defined in claim 13, wherein the air-supply system includes an air tank assembly disposed in the body and a compressor assembly coupled to the air tank assembly for providing air to the air tank assembly.

15. A vehicle as defined in claim 8, the power assembly further comprising a battery assembly disposed in the central hull and operably coupled to the an electric motor assembly for powering the water propulsion system.

16. An amphibious submersible vehicle, comprising:
a body having a central hull and a pair of wings, the central hull having a designed waterline and a watertight cabin, the pair of wings disposed on opposing sides of the central hull below the designed waterline and having an inverted wing profile that generates a downward dive force sufficient to overcome buoyancy forces of the vehicle once sufficient speed is achieved, each of the wings terminating in an upwardly oriented winglet, the pair of wings include elevons positioned aft of a center of gravity of the vehicle;
a plurality of wheels coupled to a lower portion of the body positioned to contact the ground, including a nose wheel coupled to a nose section of the central hull, a left wheel coupled to a left winglet of the pair of wings, and a right wheel coupled to a right winglet of the pair of wings;
an air-supply system that manages air pressure and oxygen levels within the cabin;
a water propulsion system coupled to the body propel the body in a forward direction; and
a power assembly that applies a motive force to one or more of the plurality of wheels, the power assembly further applies motive force to the water propulsion system.

17. A vehicle as defined in claim 16, further comprising electrical motors disposed in a first compartment of the body and batteries disposed in one or more compartments of the body separate from the first compartment.

18. A vehicle as defined in claim 16, further comprising a detachable trailer that houses a fuel tank, a power generator coupled to the fuel tank and detachably and operatively coupled to a battery assembly disposed in the body, and an air compressor detachably and operatively coupled to air tanks disposed in the body.

19. A vehicle as defined in claim 16, further comprising rudders positioned on the winglets, and wherein the body lacks a tail and tail wings.

20. A vehicle as defined in claim 8, wherein the body lacks a tail and tail wings.

* * * * *